United States Patent
Wiegman

(10) Patent No.: US 11,535,110 B1
(45) Date of Patent: Dec. 27, 2022

(54) SYSTEMS AND METHODS FOR A LOCKING ELECTRIC AIRCRAFT CONNECTOR

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/563,223

(22) Filed: Dec. 28, 2021

(51) Int. Cl.
*B60L 53/16* (2019.01)

(52) U.S. Cl.
CPC ........... *B60L 53/16* (2019.02); *B60L 2200/10* (2013.01); *B60L 2270/32* (2013.01); *B60L 2270/34* (2013.01)

(58) Field of Classification Search
CPC ....................................................... B60L 53/16
USPC ............................................................ 320/109
See application file for complete search history.

(56) References Cited

U.S. PATENT DOCUMENTS

| | | | |
|---|---|---|---|
| 8,460,028 B2 | 6/2013 | Tormey et al. | |
| 8,647,134 B2 | 2/2014 | Schulte et al. | |
| 9,216,656 B2 | 12/2015 | Nakajima | |
| 9,352,652 B2 | 5/2016 | Montemayor Cavazos et al. | |
| 9,758,046 B2 | 9/2017 | Harper et al. | |
| 9,895,987 B2 | 2/2018 | Uchiyama et al. | |
| 10,173,537 B2 | 1/2019 | Herzog | |
| 10,348,038 B2 | 7/2019 | Ognjanovski et al. | |
| 10,651,590 B1 | 5/2020 | Krucinski et al. | |
| 10,875,406 B2 | 12/2020 | Galin et al. | |
| 2010/0096490 A1* | 4/2010 | Gordon | B64C 39/024 244/17.11 |
| 2012/0126747 A1* | 5/2012 | Kiko | B60L 53/16 320/109 |
| 2012/0217928 A1 | 8/2012 | Kulidjian et al. | |
| 2013/0015814 A1 | 1/2013 | Kelty et al. | |
| 2015/0329002 A1* | 11/2015 | Broecker | B60L 53/62 320/109 |

(Continued)

FOREIGN PATENT DOCUMENTS

| | | |
|---|---|---|
| CN | 107154564 B | 12/2019 |
| EP | 2502313 B1 | 6/2017 |

(Continued)

*Primary Examiner* — Suchin Parihar
(74) *Attorney, Agent, or Firm* — Caldwell Intellectual Property Law, LLC

(57) ABSTRACT

An electric aircraft charging connector, including a set of pins, a sensor, a controller, and a locking mechanism. The set of pins may include an AC pin, the AC pin configured to supply AC power to a charging port and/or a DC pin, the DC pin configured to supply DC power to the charging port. The sensor can detect power flow from the pins to the charging port. The controller is communicatively connected to the sensor and configured to receive a signal from the sensor and send a locking signal to a locking mechanism. The locking mechanism is communicatively connected to the controller, having an engaged state wherein the charging connector is mechanically coupled to the charging port and a disengaged state wherein the charging connector is mechanically uncoupled form the charging port, the locking mechanism configured to receive a locking signal from the controller and enter the engaged state.

20 Claims, 7 Drawing Sheets

(56) References Cited

U.S. PATENT DOCUMENTS

| | | | |
|---|---|---|---|
| 2016/0068073 A1 | 3/2016 | Taylor et al. | |
| 2018/0015834 A1 | 1/2018 | Karlson et al. | |
| 2020/0338999 A1 | 10/2020 | Press et al. | |
| 2020/0361331 A1 | 11/2020 | Shin | |
| 2020/0376970 A1 | 12/2020 | Berggren et al. | |
| 2020/0395713 A1* | 12/2020 | Motomiya | B60K 1/04 |
| 2020/0398684 A1* | 12/2020 | Motomiya | H01R 13/6272 |
| 2020/0398685 A1* | 12/2020 | Motomiya | H01R 13/639 |
| 2021/0001742 A1 | 1/2021 | Choi et al. | |
| 2021/0119365 A1* | 4/2021 | Pavlovic | H01R 13/03 |
| 2021/0237605 A1* | 8/2021 | Ando | B60L 53/60 |
| 2021/0252991 A1 | 8/2021 | Pizzurro et al. | |

FOREIGN PATENT DOCUMENTS

| | | |
|---|---|---|
| WO | 2015071712 A1 | 5/2015 |
| WO | 2017143051 A1 | 8/2017 |

\* cited by examiner

SYSTEMS AND METHODS FOR A LOCKING ELECTRIC AIRCRAFT CONNECTOR

FIELD OF THE INVENTION

The present invention generally relates to the field of electric aircraft charging. In particular, the present invention is directed to systems and methods for a locking electric aircraft charging connector.

BACKGROUND

In electrical aircraft charging systems, there exists a danger that the charging connector may become detached or dislodged from the charging port while the aircraft is charging. This may cause time to be lost where the aircraft is not charging when it is supposed to be charging. Additionally, there may be danger associated with a user unplugging the charging connector from the charging port while the electric aircraft is charging and there is current flowing from the charging connector to the charging port. Existing solutions to this problem do not resolve the issue in a satisfactory manner.

SUMMARY OF THE DISCLOSURE

In an aspect, an electric vehicle charging connector including a set of pins. The Set of pins including, an alternating current pin, the alternating current pin configured to supply alternating current power to a charging port, and/or a direct current pin, the direct current pin configured to supply direct current power to the charging port. The connector also including a sensor, the sensor configured to detect the flow of power from the set of pins to the charging port, and a controller, the controller communicatively connected to the sensor, the controller configured to receive a signal from the sensor and send a locking signal to a locking mechanism as a function of the signal from the sensor. The locking mechanism communicatively connected to the controller, the locking mechanism having an engaged state wherein the charging connector is mechanically coupled to the charging port and a disengaged state wherein the charging connector is mechanically uncoupled form the charging port, the locking mechanism configured to receive a locking signal from the controller and enter the engaged state as a function of receiving the locking signal from the controller.

In another aspect, a method of electric vehicle charging including a step of monitoring a set of pins using a sensor to detect the flow of power from the set of pins to a charging port, the set of pins including an alternating current pin, the alternating current pin configured to supply alternating current power to the charging port, and/or a direct current pin, the direct current pin configured to supply direct current power to the charging port. The method further including a step of sending a locking signal to a locking mechanism when the flow of power from the set of pins to the charging port is detected. The method also including a step of engaging a locking mechanism, wherein the locking mechanism has an engaged state wherein the charging connector is mechanically coupled to the charging port, the locking mechanism has a disengaged state wherein the charging connector is mechanically uncoupled from the charging port, and the locking mechanism is communicatively connected to a controller.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a locking electric vehicle charging connector. In an embodiment, the electric vehicle charging connector includes a locking mechanism that may mechanically couple to the charging port.

Aspects of the present disclosure can be used to automatically engage a locking mechanism to mechanically couple the charging connector to the charging port. This is so, at least in part, because a sensor may detect when current is flowing between the charging connector and the charging port. Thus, the locking mechanism may be automatically engaged when the sensor detects current or voltage, for example.

Figure 1:
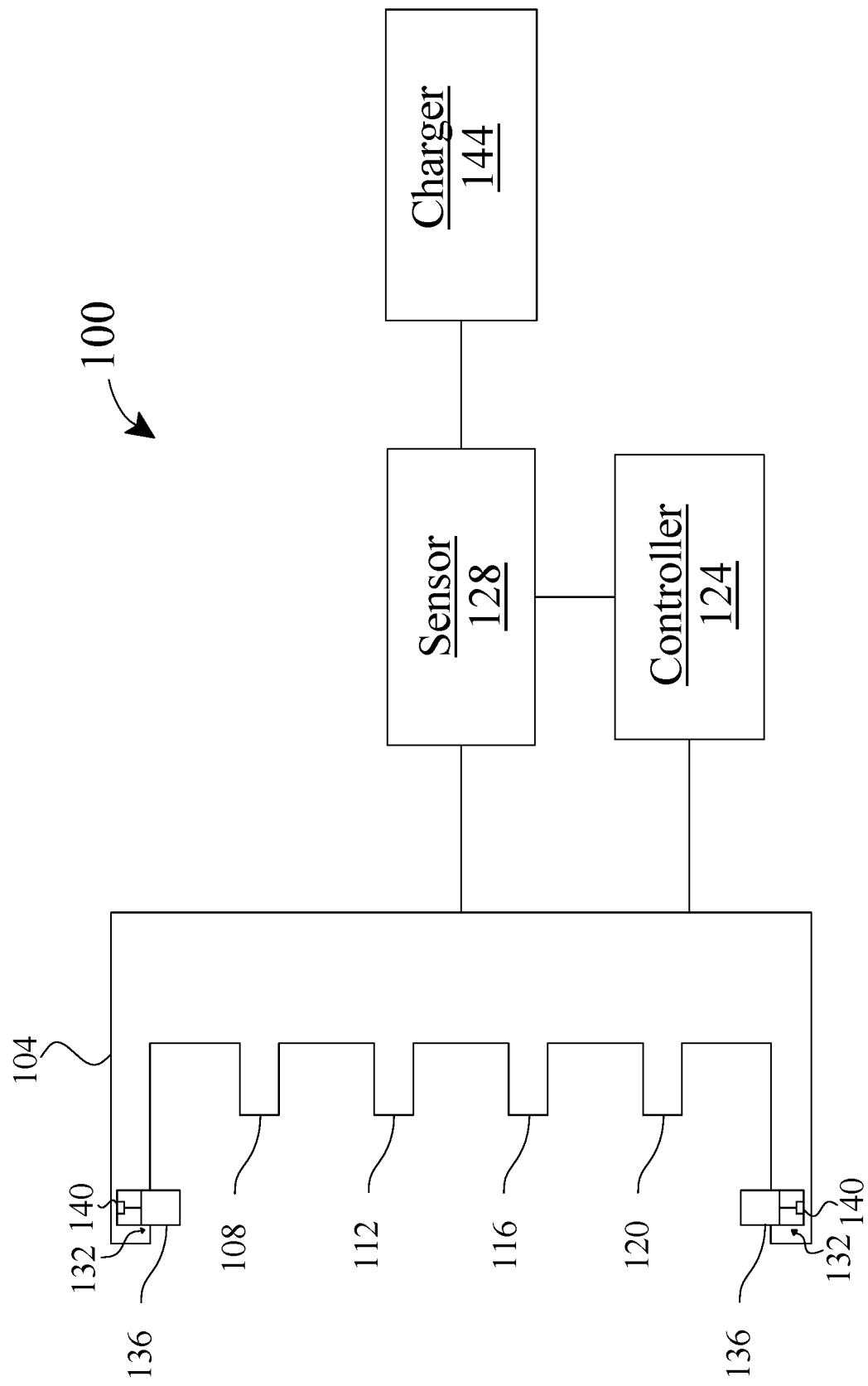
FIG. 1 is a diagram of an electric vehicle charging system having a locking bolt.

Referring now to FIG. 1, a diagram of charging system 100 is shown. Charging system 100 includes charging connector 104. Charging connector 104 may include an alternating current (AC) pin 108 and/or a direct current (DC) pin 112. AC pin 108 supplies AC power. For the purposes of this disclosure, "AC power" refers to electrical power provided with a bi-directional flow of charge, where the flow of charge is periodically reversed. AC pin 108 may supply AC power at a variety of frequencies. For example, in a non-limiting embodiment, AC pin 108 may supply AC power with a frequency of 50 Hz. In another non-limiting embodiment, AC pin 108 may supply AC power with a frequency of 60 Hz. One of ordinary skill in the art, upon reviewing the entirety of this disclosure, would realize that AC pin 108 may supply a wide variety of frequencies. AC power produces a waveform when it is plotted out on a current vs. time or voltage vs. time graph. In some embodiments, the waveform of the AC power supplied by AC pin 108 may be a sine wave. In other embodiments, the waveform of the AC power supplied by AC pin 108 may be a square wave. In some embodiments, the waveform of the AC power supplied by AC pin 108 may be a triangle wave. In yet other embodiments, the waveform of the AC power supplied by AC pin 108 may be a sawtooth wave. The AC power supplied by AC pin 108 may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power.

With continued reference to FIG. 1, DC pin 112 supplies DC power. "DC power," for the purposes of this disclosure refers to, a one-directional flow of charge. For example, in some embodiments, DC pin 112 may supply power with a constant current and voltage. As another example, in other embodiments, DC pin 112 may supply power with varying current and voltage, or varying currant constant voltage, or constant currant varying voltage. In another embodiment, when charging connector is charging certain types of batteries, DC pin 112 may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 1, charging connector 104 may include a ground pin 116. Ground pin 116 is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 1, charging connector 104 may include a variety of other pins. For example, charging connector 104 may include a proximity detection pin and/or a communication pin 120. Controller 124 may receive a current datum from the proximity detection pin. In some embodiments, the proximity detection pin may be electrically connected to the controller 124 to transmit current datum. Proximity detection pin has no current flowing through it when charging connector 104 is not connected to a port (e.g. charging port 304 in FIG. 3). Once charging connector 104 is connected to a plug, then proximity detection pin will have current flowing through it, allowing for the controller to detect, using this current flow, that the charging connector 104 is connected to a plug. In some embodiments, current datum may be the measurement of the current passing through proximity detection pin. In some embodiments proximity detection pin may have a current sensor that generates the current datum. In other embodiments, proximity detection sensor may be electrically connected to controller and controller may include a current sensor. Communication pin 120 may transmit signals between an electric vehicle and controller 124. Communication pin 120 may be electrically or communicatively connected to controller 124.

With continued reference to FIG. 1, charging system 100 includes a sensor 128. In some embodiments, sensor 128 may be part of charging connector 104. As used in this disclosure, a "sensor" is a device that is configured to detect an input and/or a phenomenon and transmit information related to the detection. Sensor 128 is communicatively connected to charging connector 104 and controller 124. Communicatively connected," for the purpose of this disclosure, means connected such that data can be transmitted, whether wirelessly or wired. Sensor 128 is also electrically connected to charging connector 104 such that it can monitor the electrical connection between charger 144 and charging connector 104. In some embodiments, sensor may be configured to measure voltage. As a nonlimiting example, sensor 128 may be a voltmeter. In some embodiments, sensor 128 may be configured to measure current. As a nonlimiting example, sensor may be an ammeter. Sensor 128 communicates its readings to controller 124. In some embodiments, sensor 128 may be any sensor suitable for detecting electric movement, such as, as a non-limiting example. accelerometers, inertial measurement units (IMUs), pressure sensors, force sensors, proximity sensors, displacement sensors, or vibrational sensors, and the like.

With continued reference to FIG. 1, sensor 128, in some embodiments, may be part of a sensor suite. Sensor suite may include a sensor or plurality thereof that may detect voltage, current, resistance, capacitance, temperature, or inductance; detection may be performed using any suitable component, set of components, and/or mechanism for direct or indirect measurement, including without limitation comparators, analog to digital converters, any form of voltmeter, or the like. Sensor suite may include digital sensors, analog sensors, or a combination thereof. Sensor suite may include digital-to-analog converters (DAC), analog-to-digital converters (ADC, A/D, A-to-D), a combination thereof, or other signal conditioning components used in transmission of a resistance datum over wired or wireless connection.

With continued reference to FIG. 1, Sensor suite may measure an electrical property at an instant, over a period of time, or periodically. Sensor suite may be configured to operate at any of these detection modes, switch between modes, or simultaneous measure in more than one mode.

With continued reference to FIG. 1, sensor suite may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite, may be measured in Fahrenheit (° F.), Celsius (° C.), Kelvin (° K), or another scale alone or in combination. The temperature measured by sensors may comprise electrical signals which are transmitted to their appropriate destination through a wireless or wired connection.

With continued reference to FIG. 1, the charging connector 104 includes a locking mechanism 132. Locking mechanism 132 may take a variety of forms. Locking mechanism 132 may be consistent with any locking mechanism disclosed as part of this disclosure. Locking mechanism 132 has an engaged state and a disengaged state. In its engaged state, locking mechanism 132 mechanically couples charging connector 104 to a charging port on an electric vehicle. In the disengaged state of locking mechanism 132, charging connector 104 is mechanically uncoupled from the charging port. Locking mechanism 132 may receive a locking signal which causes locking mechanism 132 to enter its engaged state. In some embodiments, locking mechanism 132 may receive an unlocking signal which may cause locking mechanism 132 to enter its disengaged state. In some embodiments, the locking mechanism 132 includes a locking bolt 136. Locking bolt 136 may be actuated by an actuator 140. Actuator 140 may receive a locking signal and, accordingly, actuate locking bolt 136. In this case, this may be extending locking bolt 136 into a corresponding bolt hole or other corresponding hole or notch on a charging port. While locking bolt 136 is extended, it may prevent charging connector 104 from being disconnected from a charging port. In some embodiments, locking bolt 136 may also prevent rotation of charging connector 104 with respect to a charging port when locking bolt 136 is extended. Actuator 140 may receive an unlocking signal; as a response, actuator 140 may retract locking bolt 136 from a charging port. This would allow charging connector 104 to be uncoupled from a charging port from the user. Actuator 140 may be any type of actuator capable of providing linear motion to locking bolt 136. As non-limiting examples, actuator may be an electric actuator, a hydraulic actuator, a mechanical actuator, or pneumatic actuator. After reviewing the entirety of this disclosure, a person of ordinary skill in the art would appreciate that a variety of actuators are suitable for this application. Locking mechanism 132 is depicted as a locking bolt 136 and actuator 140 in FIG. 1, but locking mechanism 132 may include many other types of locking mechanisms, such as a hook device (e.g. hook 228 in FIG. 2), or an electromagnetic lock (e.g. electromagnet 328 in FIG. 3).

With continued reference to FIG. 1, although locking mechanism is depicted as being part of charging connector 104, in some embodiments, locking mechanism may be part of a charging port. As a non-limiting example, in some embodiments, a charging port may include a locking bolt 136. In turn, charging connector 104 may include a corresponding bolt hole, ridge, or other mating feature capable of receiving locking bolt 136. In this manner, any of the locking mechanisms disclosed as part of this disclosure may be located on a charging port instead of a charging connector. Additionally, in some embodiments, locking mechanism 132 may be located on the face of charging connector 104. As a non-limiting example, in some embodiments, locking bolt 136 may be located on the face of charging connector 104. For the purposes of this disclosure, the "face" of charging connector 104 is the portion of charging connector 104 the pins, such as AC pin 108 and DC pin 112, are disposed on. In these embodiments, a charging port may include a corresponding bracket on the face of the charging port with which to receive locking bolt 136.

With continued reference to FIG. 1, charging system 100 may include a controller 124. In some embodiments, controller 124 may be part of charging connector 104. Controller 124 is communicatively connected to sensor 128. Controller 124 is also communicatively connected to charging connector 104. Controller 124 receive signals from sensor 128. These signals may contain any measurements that sensor 128 is making. As a non-limiting example, this may include current. As another non-limiting example, this may include voltage. When controller 124 receives a signal from sensor 128 that indicates that electricity is flowing from charger 144 to charging connector 104, controller 124 sends a locking signal to a locking mechanism 132 which is a component of charging connector 104. For example, a signal from sensor 128 indicating that there is voltage below a voltage threshold or current above a current threshold may cause controller 124 to send the locking signal to locking mechanism 132. In some embodiments, when controller 124 receives a signal from sensor 128 that indicates that electricity is not flowing from charger 144 to charging connector 104, controller 124 may send an unlocking signal to locking mechanism 132. For example, a signal from sensor 128 indicating that there is voltage above a voltage threshold or current below a current threshold may cause controller 124 to send the unlocking signal to locking mechanism 132.

With continued reference to FIG. 1, in some embodiments, controller 124 may be implemented using an analog circuit. For example, in some embodiments controller 124 may be implemented using an analog circuit using operational amplifiers, comparators, transistors, or the like. In some embodiments, controller 124 may be implemented using a digital circuit having one or more logic gates. In some embodiments, controller may be implemented using a combinational logic circuit, a synchronous logic circuit, an asynchronous logic circuit, or the like. In other embodiments, controller 124 may be implemented using an application specific integrated circuit (ASIC). In yet other embodiments, controller 124 may be implemented using a field programmable gate array (FPGA) and the like.

With continued reference to FIG. 1, in some embodiments, controller 124 may be a computing device, flight controller, processor, control circuit, or the like. With continued reference to FIG. 1, controller 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. controller 124 may include a single computing device operating independently, or may include two or more computing device operating in concert, in parallel, sequentially or the like; two or more computing devices may be included together in a single computing device or in two or more computing devices. controller 124 may interface or communicate with one or more additional devices as described below in further detail via a network interface device. Network interface device may be utilized for connecting controller 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 124 may include but is not limited to, for example, a computing device or cluster of computing devices in a first location and a second computing device or cluster of computing devices in a second location. controller 124 may include one or more computing devices dedicated to data storage, security, distribution of traffic for load balancing, and the like. controller 124 may distribute one or more computing tasks as described below across a plurality of computing devices of computing device, which may operate in parallel, in series, redundantly, or in any other manner used for distribution of tasks or memory between computing devices.

With continued reference to FIG. 1, controller 124 may be configured to perform any method, method step, or sequence of method steps in any embodiment described in this disclosure, in any order and with any degree of repetition. For instance, controller 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in some embodiments, charging system 100 may include a charger 144. Charger 144 can include an energy storage device or plurality of energy storage devices. As used in this disclosure, a "charger" is an electrical system and/or circuit that increases electrical energy in an energy store, for example a battery. In some embodiments, the energy storage device may be a battery. Charger 144 may provide AC and/or DC power to charging connector 104. In some embodiments, charger 144 may include the ability to provide an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some embodiments, charger 144 may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Charger 144 may be consistent with the charger disclosed in U.S. application Ser. No. 17/477,987 filed on Sep. 17, 2021, titled "Systems and Methods for Adaptive Electric Vehicle reference. Additionally, charger 144 may be consistent with the charger disclosed in U.S. application Ser. No. 17/515,448 filed on Oct. 30, 2021, titled "Systems and Methods for an Immediate Shutdown of an Electric Vehicle Charger," the entirety of which is hereby incorporated by reference.

Figure 2:
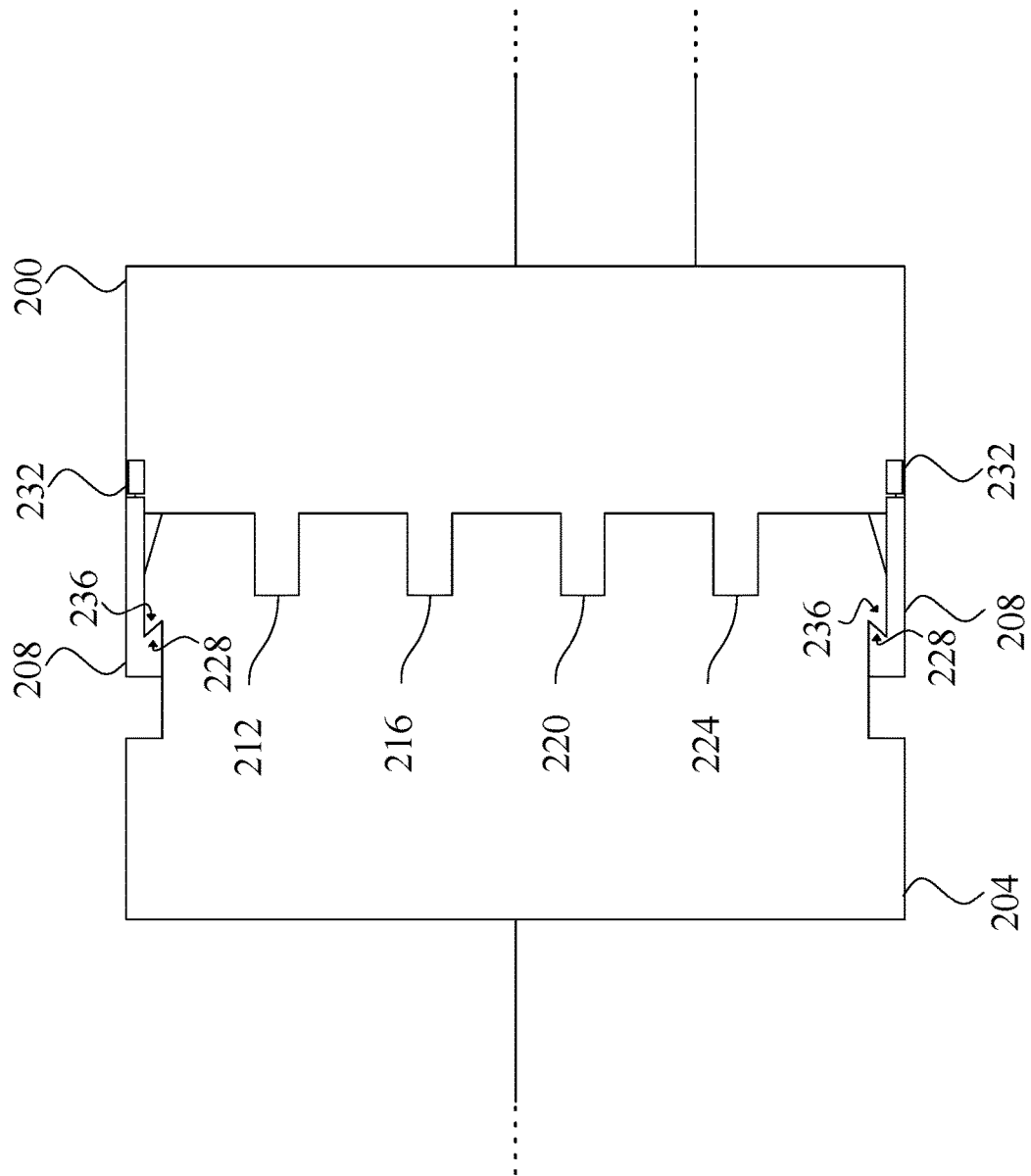
FIG. 2 is a diagram of a charging connector having a hook.

Referring now to FIG. 2, FIG. 2 depicts an exemplary embodiment of a charging connector 200 coupled to a charging port 204 by a locking mechanism 208. Charging connector 200 may include a variety of pins configured to mate with corresponding sockets on charging port 204. In an exemplary embodiment, charging connector may include an AC pin 212, a DC pin 216, a ground pin 220 and a communication pin 224. AC pin 212 may be consistent with any AC pin disclosed as part of this disclosure. DC pin 216 may be consistent with any DC pin disclosed as part of this disclosure. Ground pin 220 may be consistent with any ground pin disclosed as part of this disclosure. In some embodiments, charging connector 200 may include a proximity detection pin configured to detect when charging connector 200 is connected to charging port 204 (i.e. when the pins on charging connector 200 are mated with the corresponding sockets on charging port 204).

With continued reference to FIG. 2, locking mechanism 208 may include a hook 228 and an actuator 232. Locking mechanism 208 may have an engaged state and a disengaged state. In the engaged state of locking mechanism 208, hook 228 may be retracted by actuator 232 such that the tip of hook 228 is in a mating feature 236 on charging port 204. Mating feature 236 may take a variety of forms. As non-limiting examples, mating feature 236 may be a notch, a ridge, or the like. In this configuration, charging connector 200 is mechanically coupled to charging port 204 and a user cannot detach charging connector 200 from charging port 204. Actuator 232 retracts hook 228 in response to a locking signal from a controller. When actuator 232 receives an unlocking signal from a controller, actuator 232 may extend hook 228 so that it becomes released from mating feature 236. This is the disengaged state of locking mechanism 208. In this state, a user may separate charging connector 200 from charging port 204. In some embodiments, locking mechanism 208 may include additional features to make it easier to fit the hook 228 of locking mechanism 208 over charging port 204. As a non-limiting example, hook 228 could be attached to charging connector by a torsional spring such that hook 228 may rotate outwards (counterclockwise) to fit around mating feature 236. The torsional spring may be biased in the clockwise directs so that hook 228 rotates counterclockwise once it clears mating feature 236 so that it is in proper alignment to mate with mating feature 236. Actuator 232 may be consistent with any actuator disclosed as part of this disclosure. In some embodiments, locking mechanism 208 may be consistent with any locking mechanism 208 disclosed as part of this disclosure.

Figure 3:
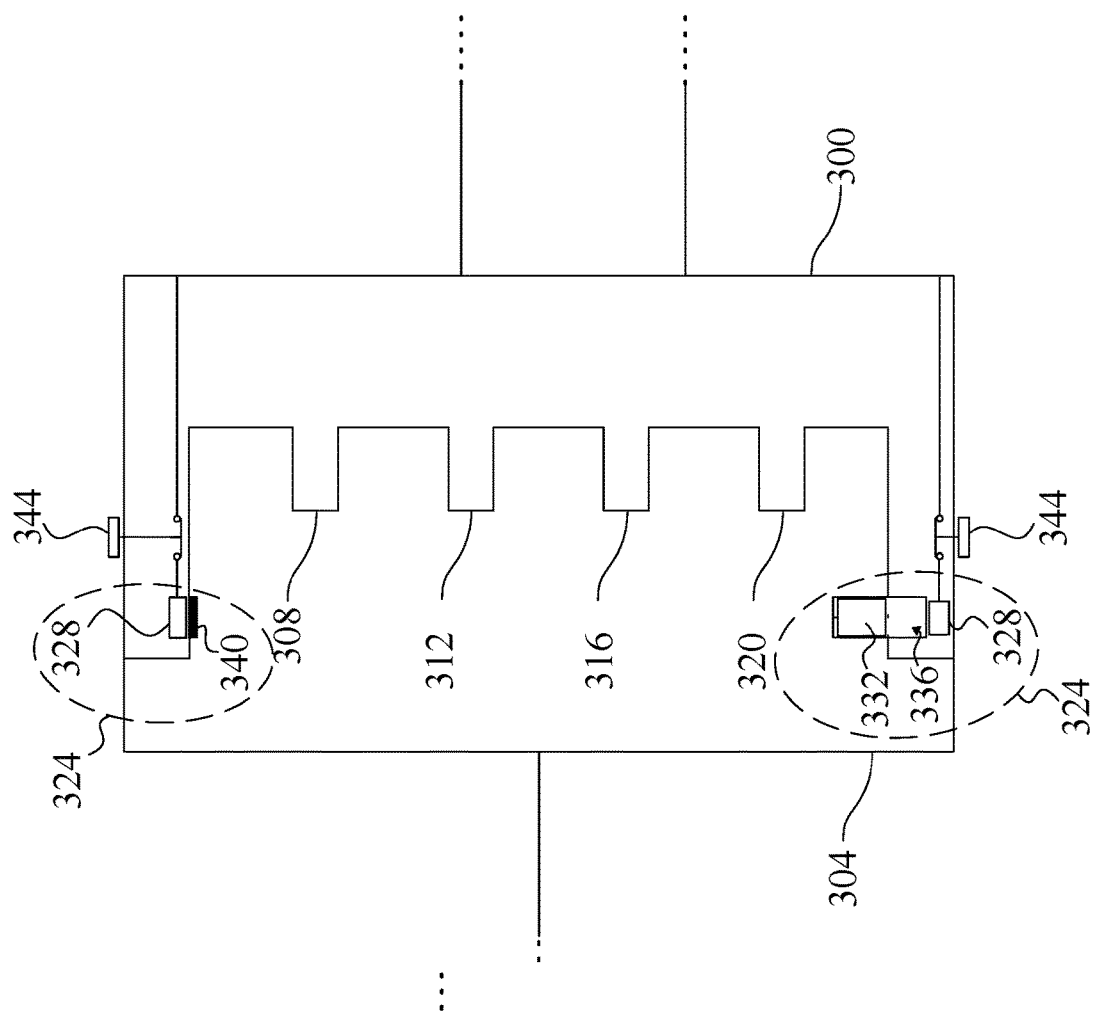
FIG. 3 is a diagram of a charging connector having electromagnetic locking systems.

Referring now to FIG. 3, an exemplary embodiment of a charging connector 300 and a charging port 304 is depicted. Charging connector 300 may include a variety of pins configured to mate with corresponding sockets on charging port 304. In an exemplary embodiment, charging connector may include an AC pin 308, a DC pin 312, a ground pin 316 and a communication pin 320. AC pin 308 may be consistent with any AC pin disclosed as part of this disclosure. DC pin 312 may be consistent with any DC pin disclosed as part of this disclosure. Ground pin 316 may be consistent with any ground pin disclosed as part of this disclosure. Communication pin 320 may be consistent with any communication pin disclosed as part of this disclosure. In some embodiments, charging connector 300 may include a proximity detection pin configured to detect when charging connector 300 is connected to charging port 304 (i.e. when the pins on charging connector 300 are mated with the corresponding sockets on charging port 304).

With continued reference to FIG. 3, charging connector 300 includes a locking mechanism 324. Locking mechanism 324 has an engaged state and a disengaged state. Locking mechanism 324 may include an electromagnet 328 and a bolt 332. In its engaged state, power is supplied to electromagnet 328. This causes electromagnet to create a magnetic field. This magnetic field attracts bolt 332 and causes it to be pulled into a hole 336 on charging connector 300. In order to best realize this effect, bolt 332 may be made of a ferrous metal, such as steel, carbon steel, alloy steel, or iron, and the like. In its disengaged state, power is not supplied to electromagnet 328. This causes bolt 332 to not be attracted to electromagnet 328. Thus, bolt 332 may be removed from hole 336. In some embodiments, bolt may be attached to a spring that automatically retracts bolt 332 when locking mechanism 324 is in its disengaged state. Electromagnet 328 may be electrically connected to a charger. Locking mechanism 324 enters its engaged state when a controller sends a locking signal. In this case, the locking signal may be merely sending electricity to electromagnet 328. This may be done in a variety of ways. As a non-limiting example, a controller may send the locking signal to a relay. When the relay receives the locking signal, it may electrically connect electromagnet 328 to a power source, such as a charger. Locking mechanism 324 may enter its disengaged state when a controller sends an unlocking signal. As a non-limiting example, a controller may send the unlocking signal to a relay. When the relay receives the unlocking signal, relay may electrically disconnect electromagnet 328 from a power source.

With continued reference to FIG. 3, in some embodiments, locking mechanism 324 may include a plate 340 instead of a bolt 332. Plate 340 may be made of a ferrous metal, such as steel, carbon steel, alloy steel, or iron, and the like. In these embodiments, when electromagnet 328 receives power, plate 340 is attracted to electromagnet 328. This holds plate 340 against electromagnet 328 such that a user cannot separate charging connector 300 from charging port 304. When electromagnet 328 does not receive power, then plate 340 is no longer attracted to electromagnet 328, meaning that a user may be able to separate charging connector 300 from charging port 304. In addition, while particular embodiments of locking mechanism 324 are depicted in FIG. 3, in other embodiments, locking mechanism 324 may be consistent with any locking mechanism disclosed in this disclosure.

With continued reference to FIG. 3, charging connector 300 may include an emergency release mechanism 344. Emergency release mechanism 344 may cause locking mechanism 324 to disengage. In an embodiment, emergency release mechanism 344 may include a button. In this embodiment, the button may have an engaged state and a disengaged state. It its disengaged state, the button may connect electromagnet 328 to a power source. In its disengaged state, the button may be unpressed. However, in its engaged state, the button may disconnect electromagnet 328 from the power source. The button enters its engaged state by being pressed. Thus, by pressing the button a user may disengage locking mechanism 324. In some embodiments, emergency release mechanism may be a lever. Flipping the lever may cause locking mechanism to be disconnected from its power source. In some embodiments, emergency release mechanism 344 may be located such that, when the emergency release mechanism is triggered (e.g. the button is pressed), power flow to the locking mechanism 324 as well as AC pin 308 and/or DC pin 312 is disconnected. This ensures that power is not flowing from charging connector 300 to charging port 304 when the user attempts to separate charging connector 300 from charging port 304 having pressed the emergency release mechanism. In some embodiments, emergency release mechanism 344 may be designed so that it cannot be accidentally engaged. As a non-limiting example, emergency release mechanism 344 may be placed behind a panel that must be opened to access emergency release mechanism 344. As another non-limiting example, emergency release mechanism 344 may include several buttons that need to be pressed at the same time in order to engage the emergency release mechanism 344. A person of ordinary skill in the art would appreciate, after having reviewed the entirety of this disclosure, would recognize that there are many possible solutions for preventing the accidental engagement of the emergency release mechanism. In some embodiments, engaging emergency release mechanism 344 may not include severing a power connection. Instead, in these cases, emergency release mechanism 344 may operate to disengage locking mechanism 324 manually. For instance, emergency release mechanism 344 may be operated to disengage a locking mechanism 324 such as a hook or bolt by disengaging said hook or bolt This may be accomplished by, for example, flipping a lever or by other mechanical means.

It should be noted that, in some embodiments, rather than the sensor and locking mechanism communicating with a controller that is part of the charging connector, the controller may be located within the charger. It should also be noted that, in some embodiments, rather than the sensor and locking mechanism communicating with a controller that is part of the charging connector, the controller may be located within the electric vehicle. In this embodiment, as a non-limiting example, the controller may be a flight controller. In this embodiment, the sensor and locking mechanism could, as a non-limiting example, use a communication pin disposed on the charging connector to communicate with the controller.

Figure 4:
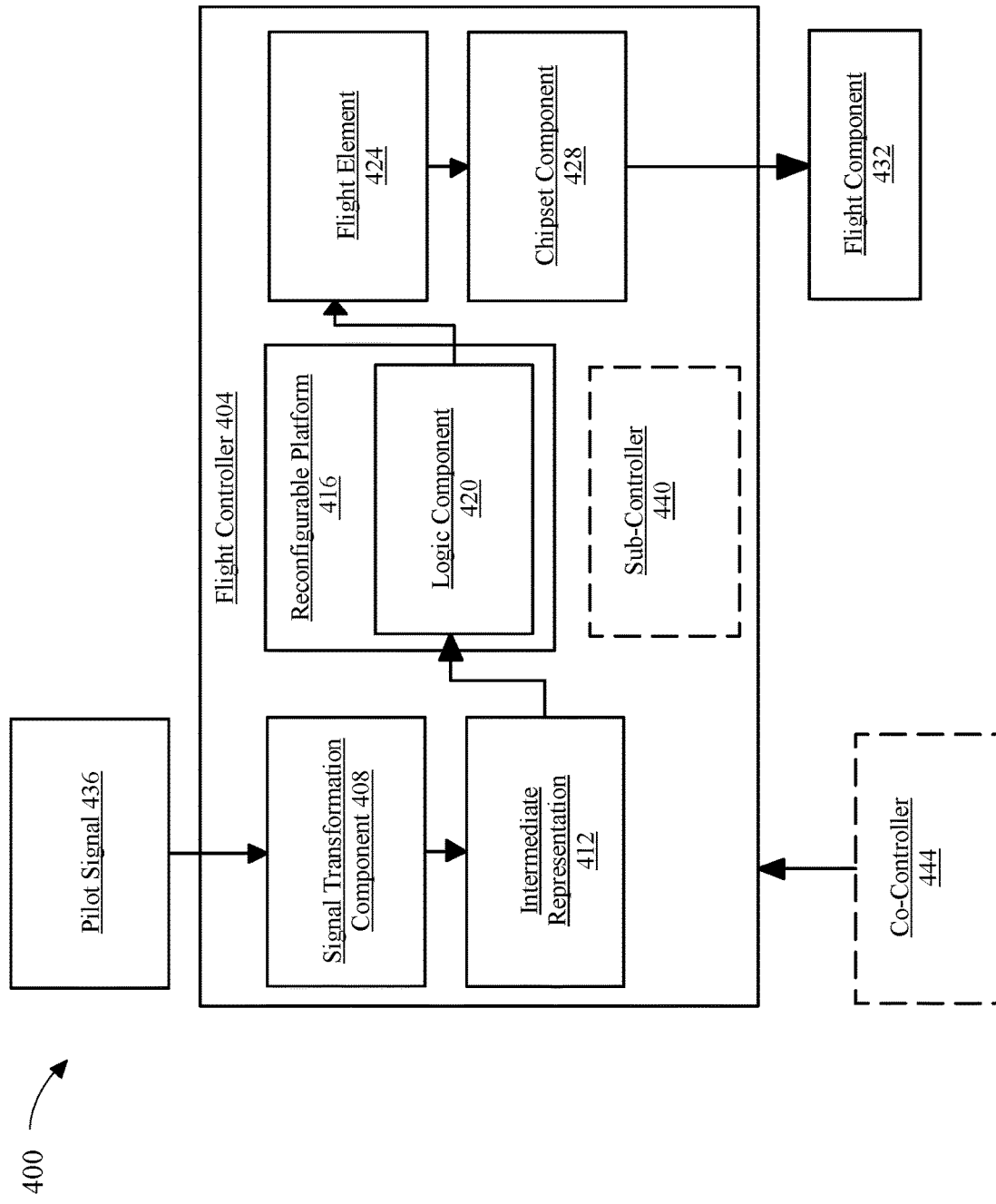
FIG. 4 is a block diagram of an exemplary flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
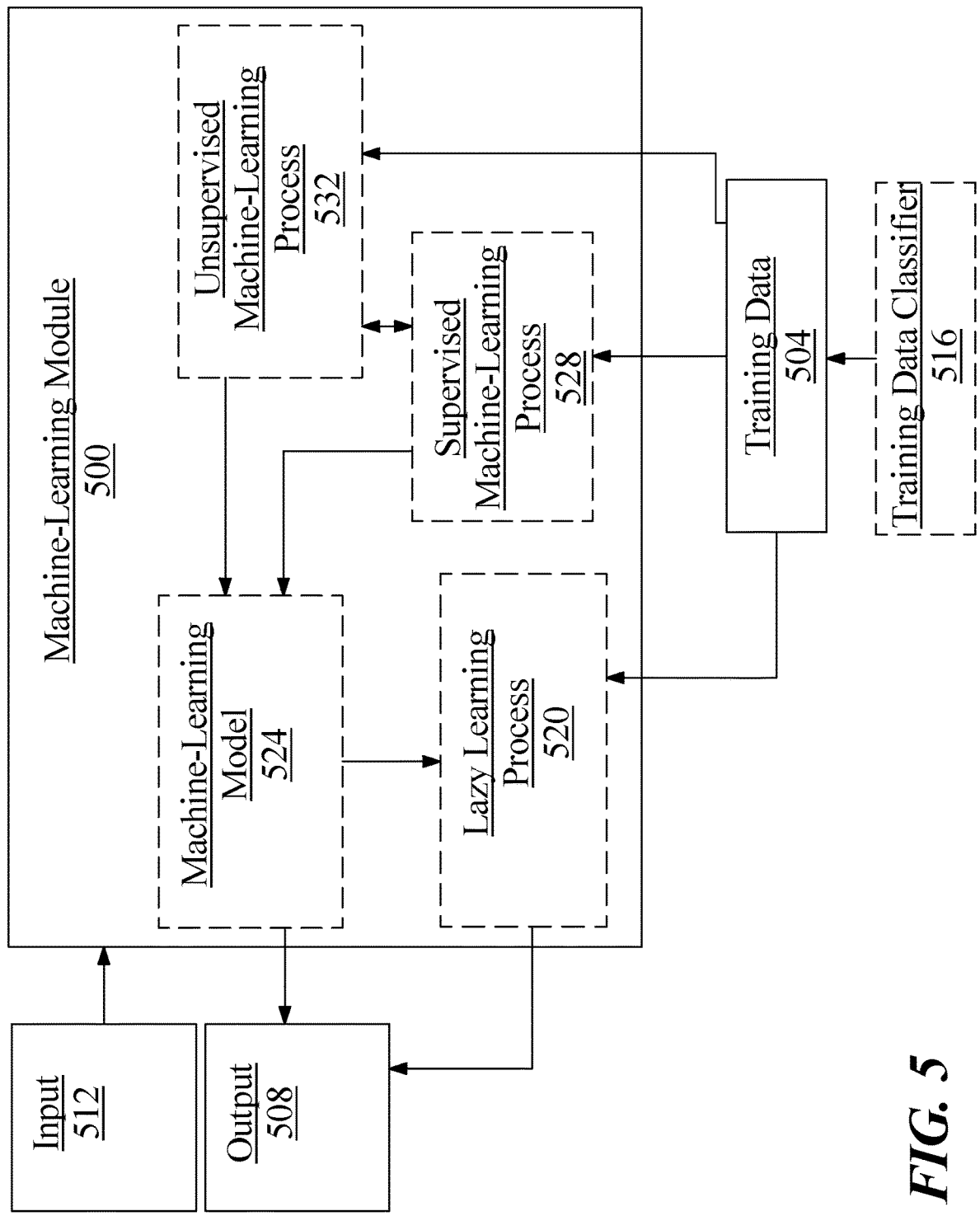
FIG. 5 is a block diagram of an exemplary machine learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
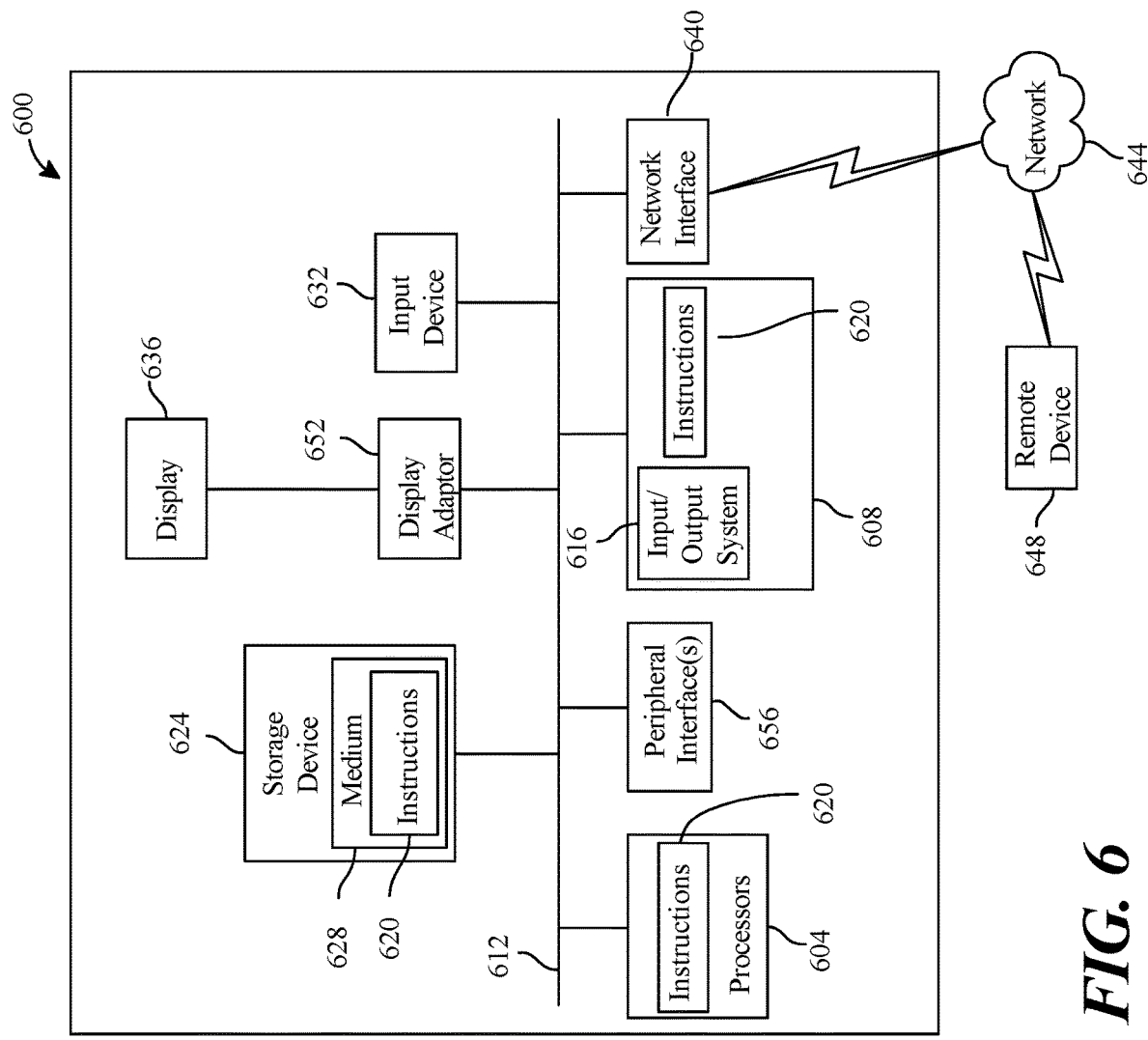
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

Figure 7:
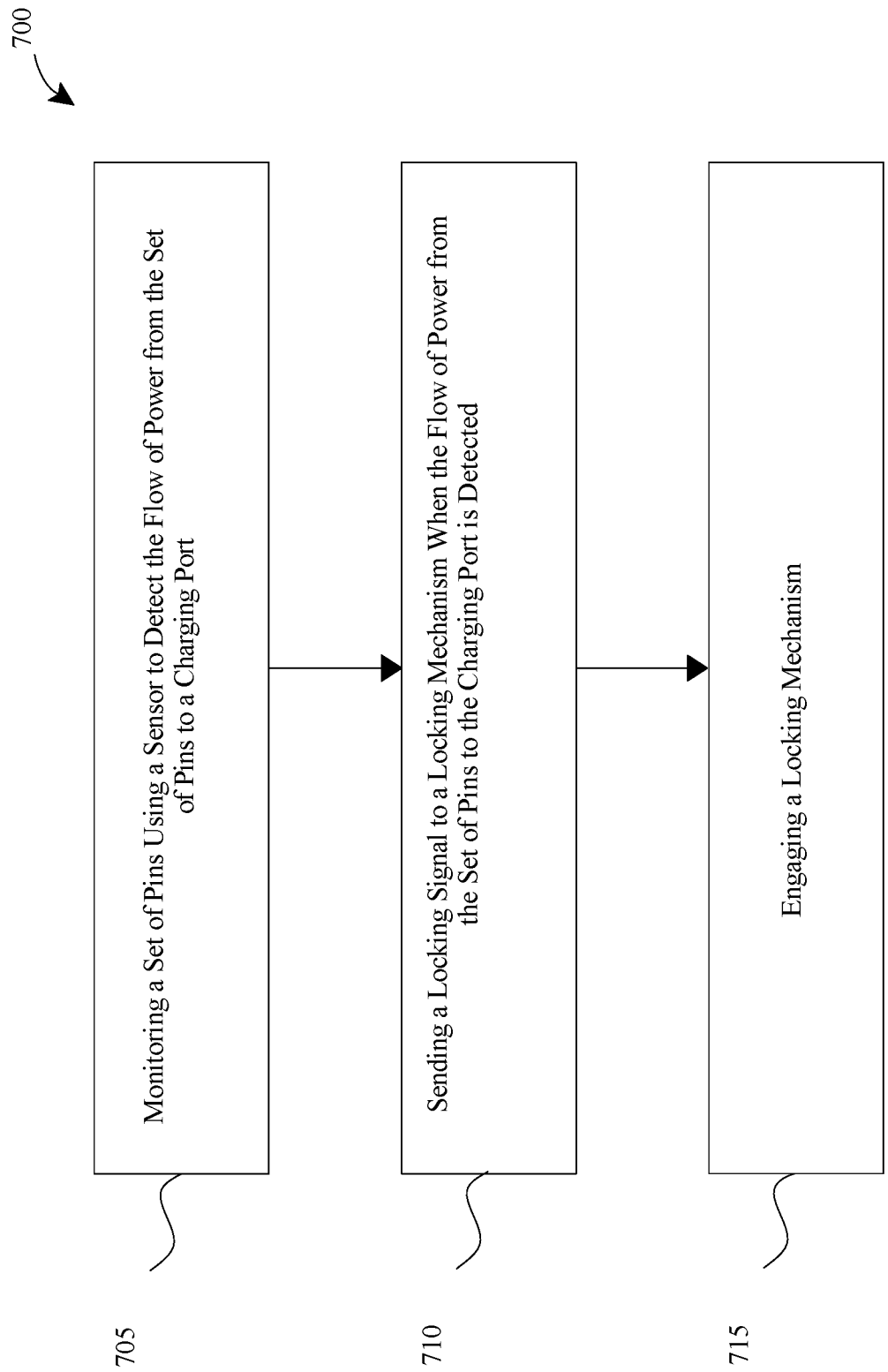
FIG. 7 is a flow diagram of a method of electric vehicle charging, including a locking mechanism.

Referring now to FIG. 7, a flowchart of a method of electric vehicle charging 700 is shown. Method 700 includes a step 705 of monitoring a set of pins using a sensor to detect the flow of power from the set of pins to a charging port. The sensor may be consistent with any sensor disclosed as part of this disclosure. The charging port may be consistent with any charging port disclosed in this disclosure. Charging port is disposed on an electric vehicle. In some embodiments, the electric vehicle may be an electric airplane. The set of pins may include an alternating current (AC) pin, the AC pin configured to supply AC power to the charging port. The set of pins also may include a direct current (DC) pin, the DC pin configured to supply DC power to the charging port. AC pin may be consistent with any AC pin disclosed in this disclosure. DC pin may be consistent with any DC pin disclosed in this disclosure. Method also includes a step 710 of sending a locking signal to a locking mechanism when the flow of power from the set of pins to the charging port is detected. The locking signal may be consistent with any locking signal disclosed in this disclosure. The locking mechanism may be consistent with any locking mechanism disclosed in this disclosure. Method 700 furthermore includes a step 715 of engaging a locking mechanism. The locking mechanism has an engaged state wherein the charging connector is mechanically coupled to the charging port. Charging connector may be consistent with any charging connector disclosed as part of this disclosure. The engaged state of the locking mechanism may be consistent with the engaged state of any locking mechanism disclosed as part of this disclosure. The locking mechanism also has a disengaged state wherein the charging connector is mechanically uncoupled from the charging port. The disengaged state of the locking mechanism may be consistent with the disengaged state of any locking mechanism disclosed as part of this disclosure. The locking mechanism is communicatively connected to a controller. The controller may be consistent with any controller disclosed as part of this disclosure.

With continued reference to FIG. 7, in some embodiments, method 700 may further include a step of sending an unlocking signal to the locking mechanism when the flow of power from the set of pins to the charging port is not detected. Unlocking signal may be consistent with any unlocking signal disclosed as part of this disclosure. Method 700, in some embodiments, may include a further step of disengaging the locking mechanism. In some embodiments, locking mechanism may include a magnet, such as, for example, electromagnet 328 in FIG. 3. In some embodiments, locking mechanism may include a locking bolt such as, for example, locking bolt 136 in FIG. 1. In some embodiments, locking mechanism may include a hook, such as, for instance, hook 228 in FIG. 2. These are merely examples of possible elements of the locking mechanism; many other possibilities are possible.

With continued reference to FIG. 7, in some embodiments of method 700, the sensor may be configured to measure current. In some embodiments of method 700, the sensor may be configured to measure voltage.

With continued reference to FIG. 7, in some embodiments, method 700 may further include a step of disengaging an emergency release mechanism. This step of disengaging an emergency release mechanism may also include disengaging the locking mechanism such that the charging connector is mechanically uncoupled from the charging port. In some embodiments, the emergency release mechanism may be a button. The button may have an engaged state and a disengaged state. In the engaged state, the charging connector may be mechanically coupled to the charging port. In the disengaged state, the charging connector may be mechanically uncoupled from the charging port. In some embodiments, the step of disengaging the emergency release mechanism further includes severing a charging connection between the charging connector and the charging port.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. An electric aircraft charging connector, comprising:
a set of pins, the set of pins comprising:
an alternating current pin, the alternating current pin configured to supply alternating current power to a charging port of an electric aircraft; and a direct current pin, the direct current pin configured to supply direct current power to the charging port of the electric aircraft;
a sensor, the sensor configured to detect a flow of power from the set of pins to the charging port of the electric aircraft;
a locking mechanism, the locking mechanism having an engaged state wherein the charging connector is mechanically coupled to the charging port and a disengaged state wherein the charging connector is mechanically uncoupled form the charging port, the locking mechanism configured to:
receive a locking signal; and
enter the engaged state as a function of receiving the locking signal; and
a controller, the controller communicatively connected to the sensor and the locking mechanism, the controller configured to:
receive a signal from the sensor; and
send the locking signal to the locking mechanism as a function of the signal from the sensor, wherein the charging connector is distinct from the electric aircraft.

2. The electric aircraft charging connector of claim 1, wherein:
the controller is further configured to send an unlocking signal to the locking mechanism as a function of the signal from the sensor; and
the locking mechanism is further configured to:
receive the unlocking signal from the controller; and
enter the disengaged state as a function of receiving the unlocking signal from the controller.

3. The electric aircraft charging connector of claim 1, wherein the sensor is configured to measure voltage.

4. The electric aircraft charging connector of claim 1, wherein the sensor is configured to measure electric current.

5. The electric aircraft charging connector of claim 1, further comprising an emergency release mechanism, the emergency release mechanism configured to switch the locking mechanism from its engaged state to its disengaged state.

6. The electric aircraft charging connector of claim 5, wherein the emergency release mechanism includes a button having an engaged state and a disengaged state, wherein the button in its engaged state causes the locking mechanism to enter its disengaged state.

7. The electric aircraft charging connector of claim 5, wherein the emergency release mechanism is further configured to sever a charging connection between the charging connector and the charging port.

8. The electric aircraft charging connector of claim 1, wherein the locking mechanism is distinct from the electric aircraft and comprises a magnet.

9. The electric aircraft charging connector of claim 1, wherein the locking mechanism is distinct from the electric aircraft and comprises a locking bolt.

10. The electric aircraft charging connector of claim 1, wherein the locking mechanism comprises a hook.

11. A method of electric aircraft charging, comprising:
monitoring a set of pins, of a charging connector, using a sensor to detect a flow of power from the set of pins to a charging port of an electric aircraft, the set of pins comprising:
an alternating current pin, the alternating current pin configured to supply alternating current power to the charging port of the electric aircraft; and
a direct current pin, the direct current pin configured to supply direct current power to the charging port of the electric aircraft;
sending a locking signal to a locking mechanism, of the charging connector, when the flow of power from the set of pins to the charging port is detected; and
engaging the locking mechanism, wherein:
the locking mechanism has an engaged state wherein the charging connector is mechanically coupled to the charging port;
the locking mechanism has a disengaged state wherein the charging connector is mechanically uncoupled from the charging port; and
the locking mechanism is communicatively connected to a controller, wherein the charging connector is distinct from the electric aircraft.

12. The method of electric aircraft charging of claim 11, further comprising:
sending an unlocking signal to the locking mechanism when the flow of power from the set of pins to the charging port is not detected; and
disengaging the locking mechanism.

13. The method of electric aircraft charging of claim 11, wherein the sensor is configured to measure voltage.

14. The method of electric aircraft charging of claim 11, wherein the sensor is configured to measure electric current.

15. The method of electric aircraft charging of claim 11, further comprising disengaging an emergency release mechanism, wherein disengaging the emergency release mechanism comprises switching the locking mechanism from its engaged state to its disengaged state.

16. The method of electric aircraft charging of claim 15, wherein the emergency release mechanism is a button having an engaged state and a disengaged state, wherein the button in its engaged state causes the locking mechanism to enter its disengaged state.

17. The method of electric aircraft charging of claim 15, wherein disengaging the emergency release mechanism further comprises severing a charging connection between the charging connector and the charging port.

18. The method of electric aircraft charging of claim 11, wherein the locking mechanism is distinct from the electric aircraft and comprises a magnet.

19. The method of electric aircraft charging of claim 11, wherein the locking mechanism is distinct from the electric aircraft and comprises a locking bolt.

20. The method of electric aircraft charging of claim 11, wherein the locking mechanism comprises a hook.

* * * * *